United States Patent
Freter

(10) Patent No.: US 8,240,717 B2
(45) Date of Patent: Aug. 14, 2012

(54) INSERTION COUPLING

(75) Inventor: Heiko Freter, Einbeck (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 0 days.

(21) Appl. No.: 12/907,650

(22) Filed: Oct. 19, 2010

(65) Prior Publication Data

US 2011/0089680 A1 Apr. 21, 2011

(30) Foreign Application Priority Data

Oct. 20, 2009 (DE) .................. 10 2009 050 076

(51) Int. Cl.
*F16L 37/00* (2006.01)
(52) U.S. Cl. ......... 285/308; 285/305; 285/310; 285/313
(58) Field of Classification Search .................. 285/305, 285/308, 321, 921, 310, 313
See application file for complete search history.

(56) References Cited

U.S. PATENT DOCUMENTS

| | | | | |
|---|---|---|---|---|
| 793,103 | A | * | 6/1905 | Scholtz .................. 285/113 |
| 4,721,331 | A | * | 1/1988 | Lemelshtrich ............ 285/305 |
| 5,374,088 | A | | 12/1994 | Moretti et al. |
| 5,511,827 | A | | 4/1996 | Steinkamp et al. |
| 5,593,187 | A | * | 1/1997 | Okuda et al. ............ 285/305 |
| 5,765,877 | A | * | 6/1998 | Sakane et al. ............ 285/93 |
| 6,318,764 | B1 | | 11/2001 | Trede et al. |
| 6,517,120 | B1 | | 2/2003 | Miyajima et al. |
| 2004/0189001 | A1 | | 9/2004 | Poder |
| 2008/0007053 | A1 | | 1/2008 | Kerlin et al. |
| 2008/0150280 | A1 | | 6/2008 | Feger et al. |
| 2008/0315576 | A1 | | 12/2008 | Moretti et al. |

FOREIGN PATENT DOCUMENTS

| | | |
|---|---|---|
| DE | 4300037 C1 | 4/1994 |
| DE | 4413346 C1 | 8/1995 |
| DE | 4443346 A1 | 6/1996 |
| DE | 19722842 C2 | 12/1998 |
| DE | 102004062887 B3 | 10/2005 |
| EP | 1719944 A2 | 11/2006 |

* cited by examiner

*Primary Examiner* — Aaron Dunwoody
*Assistant Examiner* — Fannie Kee
(74) *Attorney, Agent, or Firm* — Fox Rothschild LLP

(57) ABSTRACT

An insertion coupling which can be used for example for a vacuum line consists of an insertion part and a sleeve part (1), wherein a locking element (5), which can be brought into engagement with a retaining rib of the insertion part, and an actuation element (10) are integrally formed on a housing tab (9) which extends in an arc-shaped manner around a longitudinal axis of the sleeve part (1) and can be elastically deflected radially. A movement of the locking element (5) in a radially outward direction and thus a release of the engaged state between the sleeve part (1) and the insertion part is possible by moving the actuation element (10) in an actuation direction (13). A construction which is particularly simple in design is produced owing to the small number of parts. The sleeve part (1) is provided with a window, by means of which a correct engaged state of the locking element with the retaining rib can be visually checked.

20 Claims, 4 Drawing Sheets

INSERTION COUPLING

BACKGROUND

The invention relates to an insertion coupling.

Such insertion couplings are used, for example, in vacuum lines in automotive construction, to produce a connection between a tubular insertion part which is provided with a circumferential retaining rib and a sleeve-like coupling body. The insertion part can be produced from plastic or metal and be the end of the line or the connecting piece on a housing. The coupling body is usually manufactured from plastic and mounted on a line, but can also be a component of a housing.

Insertion couplings of this type are characterized by a locking mechanism which is effective between the coupling body and the insertion part and is intended to be a sealing connection between the line elements to be coupled in each case. They are known in numerous forms, particular attention having been directed toward functional reliability and properties of manageability with regard to assembly.

DE 43 000 37 C1 discloses an insertion coupling of the type mentioned at the start in which the locking mechanism is formed between the coupling body and the insertion part by a part which can be displaced radially with respect to the main axis and is intended to engage behind a retaining rib of the insertion part.

Comparable insertion couplings are known from DE 197 22 842 C2, DE 10 2004 062 887 B3, EP 17 19 944 A2, US 2004/0189001 A1 and DE 10 1006 019 257 A1.

The disadvantage of these insertion couplings is that the coupling is composed of various parts, which results in high costs for the individual parts, complex assembly and a higher frequency of errors. Correct latching of the insertion part in the coupling body is not always completely visible from the outside in the above embodiments.

The insertion couplings must be assembled in two directions, so the complexity for automatic assembly is considerably increased.

A further insertion coupling is known for example from DE 44 13 346 C1, the locking mechanism of which is formed by a bushing which is inserted into the coupling body axially and can be displaced axially to a limited extent when in the inserted position. The bushing consists of a ring which is positioned in the sleeve base of the coupling body, from which ring four webs extend with parallel axes, uniformly distributed around the circumference and toward the open end of the coupling body, two of which webs bear mutually diametrically opposite latching hooks which are intended to interact with the retaining rib of the insertion part. All webs are provided radially on the outside with projections which are accommodated in recesses of the coupling body such that they can move axially to a limited extent, so that the bushing is gripped by means of two protrusions, which project out of the coupling body and are integrally formed on the outside of the webs which are not provided with latching hooks, and can be moved axially relative to the coupling body in order to release the coupling state of the insertion part with the coupling body.

The disadvantage of this insertion coupling is that correct latching is not visible from the outside. Furthermore, the bushing forms an effective surface for the seal which is formed by means of O-rings. Owing to the necessary axial displaceability of the bushing, the O-rings used are pushed into an axial end position when the insertion part is introduced and pushed into an opposite axial end position with internal pressure when the coupling is loaded according to its intended use. Dirt can penetrate from the outside into the front region through which the O-rings must pass. The O-rings execute this displacement every time the coupling state is released and induced so that there is the risk that the O-rings become twisted and/or dirt particles accumulate in the sealing regions during this movement, as a result of which reliable sealing is no longer provided. This can present a considerable problem, especially if the insertion coupling is used in fuel lines. A sealing check during series production when the coupling is assembled into a module is not possible, as the O-rings only assume their effective position once assembled.

Another insertion coupling is known from the document U.S. Pat. No. 6,517,120 B1 and consists of an insertion part, which bears a circumferential retaining rib, and a sleeve part which bears a locking element which is intended to latch with the retaining rib. The locking element is arranged on the end of a tab which extends in an arc-shaped manner around the longitudinal axis of the sleeve part and is integrally formed on the latter, and extends into a gap in the sleeve part. Inside this gap, integrally formed on the sleeve part, there are discrete protrusions which limit axial deflection of the tabs on both sides. A locking face is integrally formed laterally on the locking element which has an introduction slant, which locking face forms an extraction securing means in combination with a stop tab, which projects radially beyond this face on the outside and is integrally formed on the sleeve part, in the event of an axial load on the engaged state of the insertion coupling by limiting a radial deflection of the locking element. The locking element is furthermore provided with an actuation section which projects radially out of the structure of the insertion coupling. The construction of this insertion coupling, the sleeve part of which consists of two parts which are inserted one inside the other, becomes relatively complicated. Also, it cannot be established whether a satisfactory engaged state is present with just a visual inspection, at least not easily.

SUMMARY OF THE INVENTION

It is the object of the invention to improve an insertion coupling of the type described at the start while maintaining its functionality and a construction of simple design with regard to a reduced number of individual parts and its manageability with respect to assembly. This object is achieved in such an insertion coupling having an insertion part which has a circumferential retaining rib and a sleeve part which is provided with at least one locking element intended to latch in a form-fitting manner with the retaining rib. The sleeve part further includes a housing tab which extends in an arc-shaped manner around a longitudinal axis of the sleeve part and the housing tab includes the locking element integrally formed with the housing tab and an actuation element integrally formed with the locking element and the housing tab. The locking element is arranged to be movable radially between a position which constitutes latching with the retaining rib and a position which releases this latching by means of the actuation element. The sleeve part further has housing ribs which between them defines a recess of the sleeve part, wherein the actuation element is arranged in the recess. The housing tab and the sleeve part have bearing faces formed thereon which run obliquely to a central axis (longitudinal axis) of the sleeve part, the bearing faces cooperating to radially fix the housing tab and thus an engaged state of the sleeve part and the insertion part under an influence of internal pressure. Gaps are arranged axially on both sides between the housing tab and the sleeve part, one of the gaps facing a free end of the sleeve part, the one gap being formed by the oblique bearing faces.

The locking element is formed integrally on an elastically deflectable part of the sleeve part. This results in a reduction in the number of the individual parts needed for the insertion coupling and thus a construction which is simple in design so that in fact there are only two parts, except for a seal.

The retaining rib of the insertion part is intended to interact with the locking element and is used to fix the insertion part axially inside the sleeve part.

Further advantageous features are provided by the invention. For example, a uniform sealing ring can be used as the seal, which comprises two sealing regions which are independent from each other, namely an overpressure region and a vacuum region.

The insertion part can be of a conventional cylindrical type.

BRIEF DESCRIPTION OF THE DRAWINGS

The invention is explained in more detail below with reference to the preferred exemplary embodiment which is shown in the attached drawings. In the figures.

DETAILED DESCRIPTION

Figure 1:
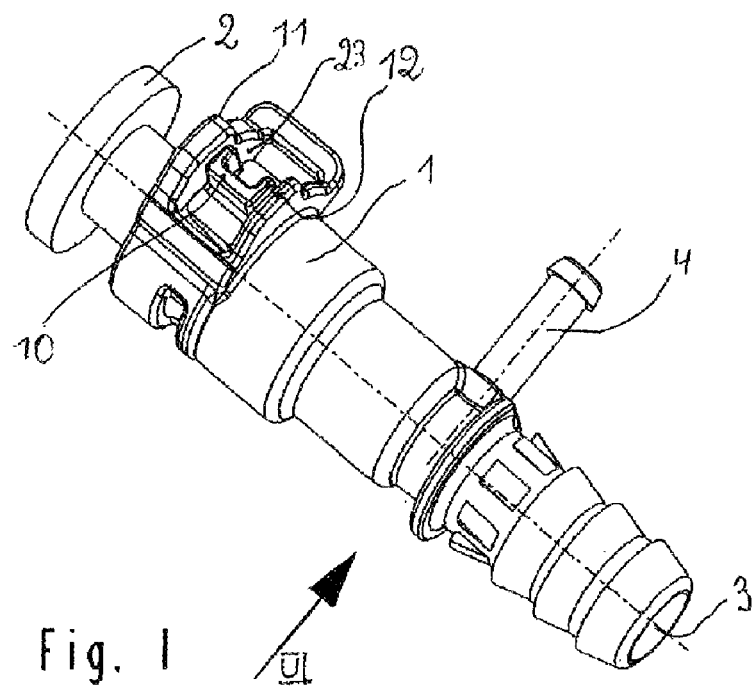
FIG. 1 shows a perspective view of an insertion coupling according to the invention with an inserted insertion part.

FIG. 1 shows the sleeve part 1 and the insertion part 2 of an insertion coupling according to the invention in the assembled state. The flow cross section of the insertion part 2 is in continuous connection with a connector 3 and an outflow 4.

Figure 2:
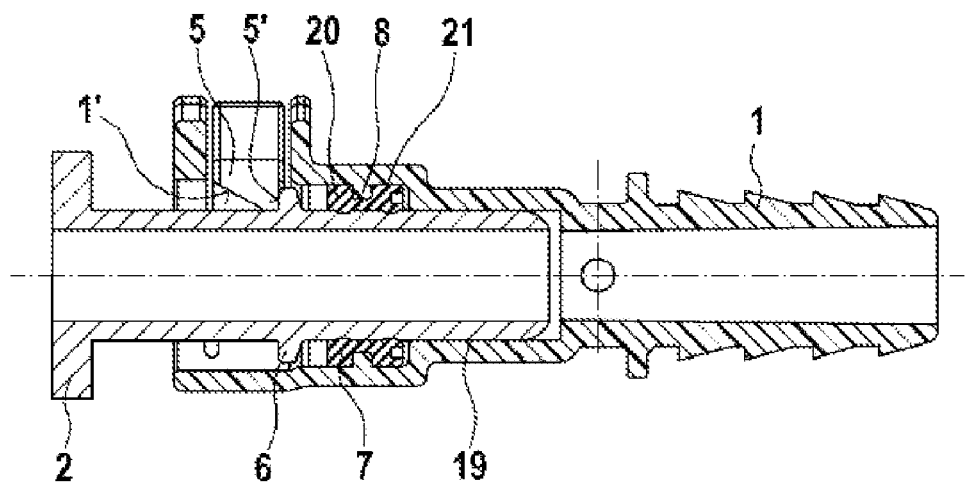
FIG. 2 shows a plane diagram of the insertion coupling according to FIG. 1 in a longitudinal section.

FIG. 2 shows the insertion coupling in a longitudinal section, wherein it can be seen that a locking element 5 engages behind a circumferential retaining rib 6 which is integrally formed on the insertion part 2 for the purpose of forming an axial extraction securing means. The insertion part 2 is centered in the sleeve part 1 by means of cylindrical faces of the sleeve part and of the insertion part which are guided into each other in a centering region 19.

The insertion part is sealed by a sealing ring 7, which is radially clamped between concentric cylindrical faces of the insertion part 2 and of the sleeve part 1. A circumferential retaining rib 8 is used for axially fixing the sealing ring 7 in the assembled state of the insertion coupling. The sealing ring 7 is subdivided into a vacuum sealing section 20 and an overpressure sealing section 21.

A circumferential introduction slant 1' is integrally formed on the locking element 5, which slant comes to bear against the retaining rib 6 while the insertion part 2 is introduced into the sleeve part 1 and causes the locking element 5 to be displaced radially toward the outside, so that an insertion diameter is correspondingly enlarged and the insertion part can be further pushed in. When in the completely pushed in state the locking element 5 moves radially inward after moving over the peak of the retaining rib 6 into its latched position shown in the drawing.

The locking element 5 is provided on its side which faces axially away from the introduction slant 1' with a radially oriented bearing face 5' which is intended to bear against the similarly oriented bearing face of the retaining rib 6 in the assembled state of the insertion coupling.

The locking element 5 is configured or arranged such that it can be radially elastically deflected in a manner which is still to be described below.

Figure 3:
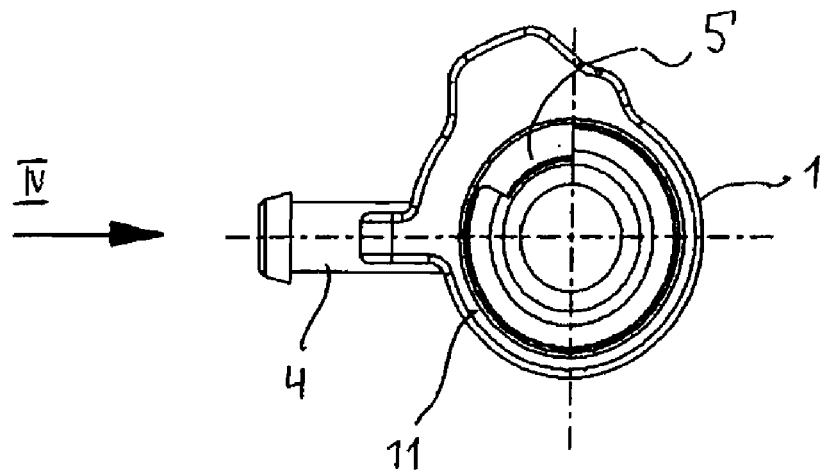
FIG. 3 shows an end view of the sleeve part of the insertion coupling corresponding to a viewing direction III of FIG. 4.

FIG. 3 shows merely by way of example a circular arc-shaped configuration of the locking element 5. In contrast to this embodiment, other forms of locking element or locking elements subdivided into segments can be used.

Figure 4:
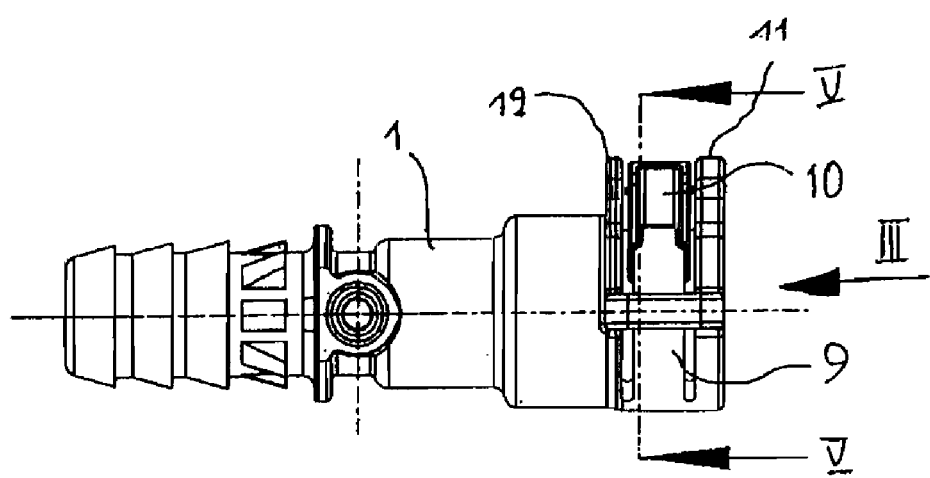
FIG. 4 shows a longitudinal side view of the sleeve part of the insertion coupling corresponding to a viewing direction IV of FIG. 3.
Figure 5:
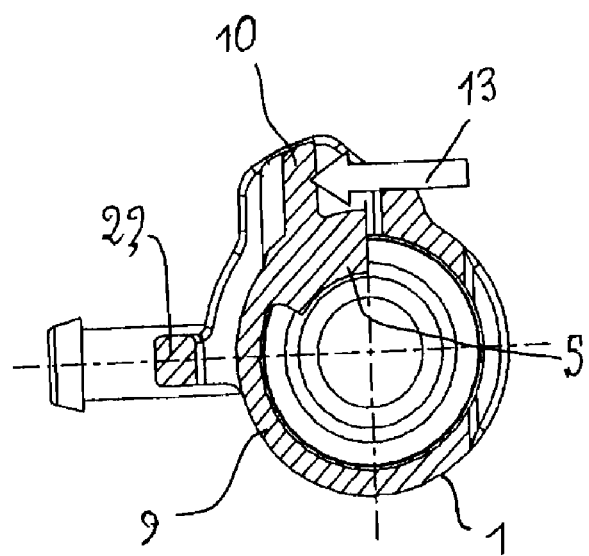
FIG. 5 shows a diagram of the insertion coupling in a cross section V-V of FIG. 4.

It can be seen from FIGS. 4 and 5 that the locking element 5 is integrally formed on a housing tab 9, an actuation element 10 which is formed in one piece with the locking element 5 extending radially on the outside of the latter. Both the actuation element 10 and the locking element 5 are supported axially between front and rear housing ribs 11, 12 which axially delimit a recess 23 in the sleeve part 1. In this manner, namely if the actuation element 10 does not project radially beyond the housing ribs 11, 12, inadvertent actuation of the actuation element 10 is prevented.

With the application of a force in an actuation direction 13 (FIG. 5) on the actuation element 10, the housing tab 9 is deformed elastically so far in the radially outward direction that the axially effective, form-fitting engagement between the retaining rib 6 of the insertion part 2 and the locking element 5 is released and the insertion part 2 can then be pulled out of the sleeve part 1. Reference number 22 denotes a stop by means of which the elastic deflection of the housing tab 9 in the radially outward direction is limited.

Figure 6:
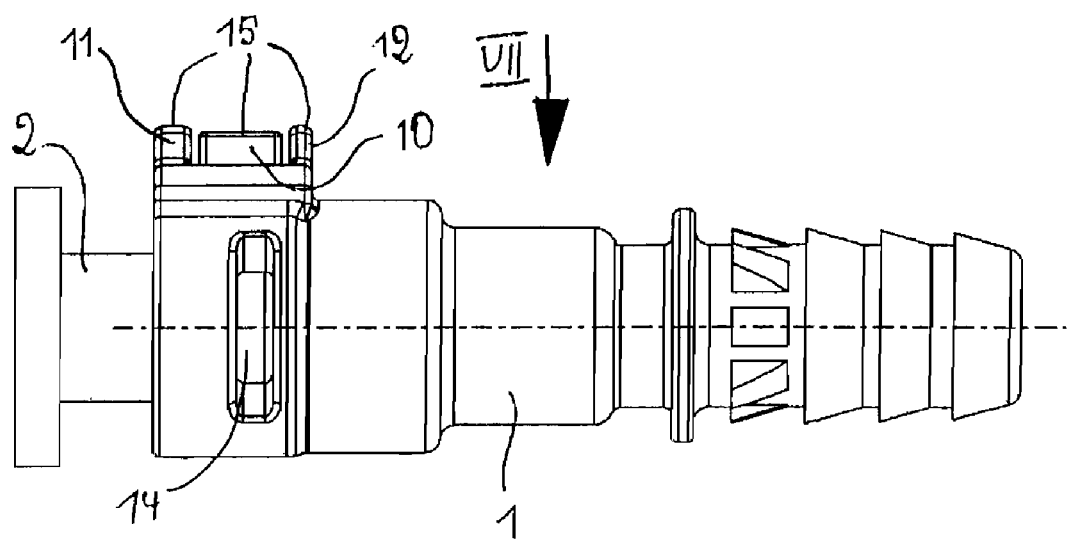
FIG. 6 shows a longitudinal side view of the insertion coupling corresponding to a viewing direction VI of FIG. 1.

FIG. 6 shows that the sleeve part 1 is characterized by a window 14, which is used for visually checking the latching state, as the retaining rib 6 is visible in this window when correctly latched. A further indication of correct latching is provided by the bearing heights 15 of the housing ribs 11, 12 and of the actuation element 10. These three elements extend at a common bearing height 15 when correctly latched.

Figure 7:
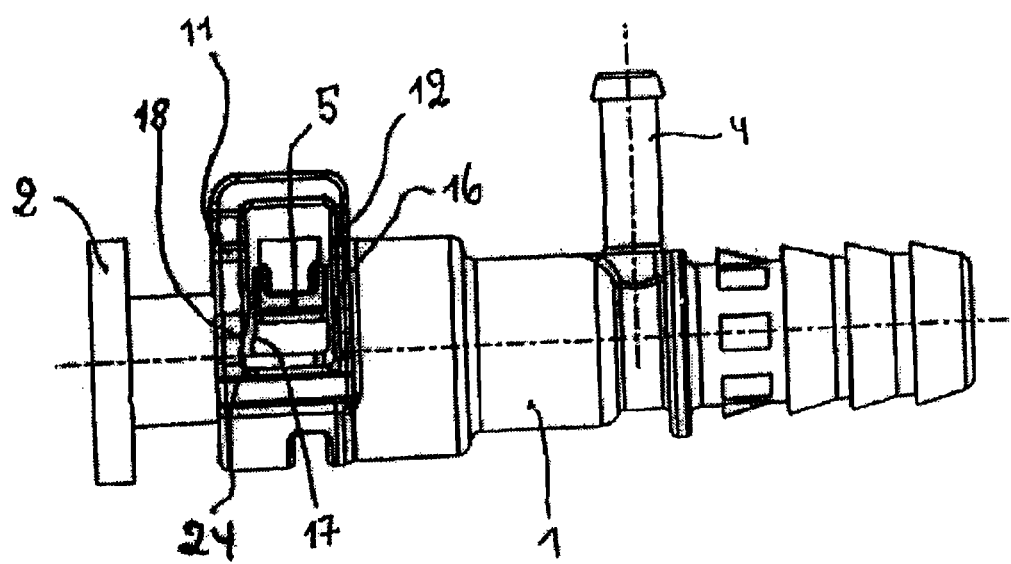
FIG. 7 shows a view of the insertion coupling corresponding to a viewing direction VII of FIG. 6.

FIG. 7 shows the axial support of the locking element 5 between the housing ribs 11, 12, there being gaps in each case between the locking element 5 and the faces of the housing ribs which face the locking element when in the axially unloaded state. A front gap 24, that is, facing the free end of the insertion part 2 (i.e., the end inserted into the sleeve part 1), runs on a plane which is aligned obliquely to the center axis of the insertion coupling, whereas a rear, axially opposite gap 16 extends in a plane which runs vertically to the center axis of the insertion coupling.

When an internal pressure occurs, the insertion part 2 is moved axially out of the sleeve part 1 so that the retaining rib 6 of the insertion part 2 presses against the locking element 5, which is then axially elastically deflected and increasingly bridges the front gap 24. A bearing face 17 of the locking element 5 then comes to bear against a bearing face 18 of the housing rib 11, so that an axially effective form-fitting fixing of the locking element in the insertion coupling is produced.

Owing to said oblique arrangement of the front gap 24, radial deflection of the housing tab 9 in the radially outward direction and thus of the locking element 5 is prevented in this position.

The rear gap 16 is wider than the front gap 24 by such an amount that the sloping position of the front gap 24 can be compensated when the insertion part 2 is disassembled.

The essential feature of the configuration of the front gap 24 is that the bearing faces 17, 18 form a form fit when the insertion part 2 is displaced axially with respect to the sleeve part 1, which form fit prevents the locking element 5 from being deflected radially. Owing to this configuration, disassembly of the coupling, namely a release of the engaged state existing between the insertion part 2 and the sleeve part 1 is no longer possible from a certain level of a prevailing internal pressure, so that for example large amounts of hazardous substances are prevented from leaking and spraying into the environment in a simple manner.

LIST OF REFERENCE SYMBOLS

1. Sleeve part
1'. Introduction slant
2. Insertion part
3. Connector
4. Outflow
5. Locking element
5'. Bearing face
6. Retaining rib
7. Sealing ring
8. Retaining rib
9. Housing tab
10. Actuation element
11. Housing rib
12. Housing rib
13. Actuation direction
14. Window
15. Height
16. Gap
17. Bearing face
18. Bearing face
19. Centering region
20. Vacuum sealing section
21. Overpressure sealing section
22. Stop
23. Recess
24. Gap

What is claimed is:

1. An insertion coupling, comprising:
an insertion part which has a circumferential retaining rib;
a sleeve part which is provided with at least one locking element to latch with the retaining rib, said sleeve part further including a housing tab which extends in an arc around a longitudinal axis of the sleeve part and an actuation element, wherein the locking element, the housing tab, and the actuation element are formed as a single piece, wherein the locking element is arranged to be moved radially between a position which constitutes latching with the retaining rib and a position which releases this latching by means of the actuation element, said sleeve part further having housing ribs which define a recess of the sleeve part, wherein the actuation element is arranged in said recess;
said housing tab and said sleeve part each have having bearing faces formed thereon which extend obliquely to the longitudinal axis of the sleeve part and which face one another, said bearing faces cooperating whereby one of said bearing faces bears against the other of said bearing faces so as to radially fix the housing tab and thus the locking element attached thereto, thereby maintaining an engaged state of the sleeve part and the insertion part under an influence of internal pressure; and
gaps arranged axially on both sides between the housing tab and the sleeve part, one of said gaps facing a free end of the sleeve part, said one gap being formed by the oblique bearing faces.

2. The insertion coupling as claimed in claim 1, wherein at least one sealing ring is arranged in an annular space between the sleeve part and the insertion part.

3. The insertion coupling as claimed in claim 2, further comprising at least one retaining rib in the sleeve part for axially fixing the at least one sealing ring.

4. The insertion coupling as claimed in claim 2, wherein the at least one sealing ring is subdivided into a vacuum section and an overpressure section.

5. The insertion coupling as claimed in claim 2, further comprising an introduction slant integrally formed on the locking element, which is intended to interact with the retaining rib.

6. The insertion coupling as claimed in claim 2, further comprising a stop which limits a radial deflection of the housing tab.

7. The insertion coupling as claimed in claim 2, wherein the sleeve part is provided with a window to show the latching state visually.

8. The insertion coupling as claimed in claim 1, further comprising an introduction slant integrally formed on the locking element, which is intended to interact with the retaining rib.

9. The insertion coupling as claimed in claim 8, further comprising a stop which limits a radial deflection of the housing tab.

10. The insertion coupling as claimed in claim 8, wherein the sleeve part is provided with a window to show the latching state visually.

11. The insertion coupling as claimed in claim 8, further comprising at least one retaining rib in the sleeve part for axially fixing the at least one sealing ring.

12. The insertion coupling as claimed in claim 8, wherein the at least one sealing ring is subdivided into a vacuum section and an overpressure section.

13. The insertion coupling as claimed in claim 1, further comprising a stop which limits a radial deflection of the housing tab.

14. The insertion coupling as claimed in claim 13, wherein the sleeve part is provided with a window to show the latching state visually.

15. The insertion coupling as claimed in claim 13, further comprising at least one retaining rib in the sleeve part for axially fixing the at least one sealing ring.

16. The insertion coupling as claimed in claim 13, wherein the at least one sealing ring is subdivided into a vacuum section and an overpressure section.

17. The insertion coupling as claimed in claim 1, wherein the sleeve part is provided with a window to show the latching state visually.

18. The insertion coupling as claimed in claim 17, further comprising at least one retaining rib in the sleeve part for axially fixing the at least one sealing ring.

19. The insertion coupling of claim 1, wherein said bearing faces are shaped to form-fit against one another to radially fix the housing tab.

20. The insertion coupling of claim 1, wherein said housing ribs and said actuation element are situated at a common bearing height when the locking element is latched correctly with the retaining rib.

* * * * *